United States Patent
De Nicolas

(10) Patent No.: US 6,850,760 B2
(45) Date of Patent: Feb. 1, 2005

(54) METHOD AND DEVICES FOR IMPROVED LOCATION UPDATING IN A MOBILE COMMUNICATION SYSTEM

(75) Inventor: Arturo Martin De Nicolas, Aachen (DE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 419 days.

(21) Appl. No.: 09/808,494

(22) Filed: Mar. 14, 2001

(65) Prior Publication Data

US 2002/0002049 A1 Jan. 3, 2002

(30) Foreign Application Priority Data

Mar. 17, 2000 (EP) .......................................... 00105747

(51) Int. Cl.[7] ................................................ H04Q 7/20
(52) U.S. Cl. ................ 455/433; 455/432.1; 455/435.1; 455/456.1; 455/432.2
(58) Field of Search ................................ 455/422, 558, 455/454, 557, 462, 463, 465, 432.1–432.3, 433, 435.1, 435.2, 456.1, 437, 438, 411, 419, 434, 435, 426, 423, 432, 453, 560, 439

(56) References Cited

U.S. PATENT DOCUMENTS

| | | | | |
|---|---|---|---|---|
| 5,400,390 A | * | 3/1995 | Salin ........................... | 455/433 |
| 5,943,619 A | * | 8/1999 | Coyne et al. ................ | 455/433 |
| 5,943,620 A | | 8/1999 | Boltz et al. .................. | 455/445 |
| 6,122,510 A | * | 9/2000 | Granberg ..................... | 455/433 |
| 6,181,939 B1 | * | 1/2001 | Ahvenainen ................. | 455/433 |
| 6,195,550 B1 | * | 2/2001 | Sollee et al. ............. | 455/432.1 |
| 6,230,017 B1 | * | 5/2001 | Andersson et al. ....... | 455/456.6 |
| 6,477,375 B1 | * | 11/2002 | Ho et al. ..................... | 455/445 |
| 6,516,193 B1 | * | 2/2003 | Salmela et al. .......... | 455/432.3 |
| 6,560,455 B2 | * | 5/2003 | Amin et al. ............. | 455/432.3 |
| 6,597,910 B1 | * | 7/2003 | Ra ............................ | 455/433 |

FOREIGN PATENT DOCUMENTS

GB          2 328 119 A          2/1999

OTHER PUBLICATIONS

Pecci, R., European Search Report, App. No. EP 00 105747, Aug. 10, 2000, pp. 1–3.

* cited by examiner

Primary Examiner—William Trost
Assistant Examiner—Joseph Nguyen

(57) ABSTRACT

A method for a location update in a mobile communication system with a home location register (HLR) and visitor location registers (VLR) is described. The visitor location registers (VLR) serve different parts of the area covered by the communication system and the home location register holds a data record assigned to a user, the data record comprising parameters for the establishment of connections with the user and an identification of the visitor location register presently serving the user. Parameters from the record can be copied from the home location register to the visitor location register serving the user. In the method it is detected that a user has entered the area served by a visitor location register and a location update message (18) is sent which indicates the identity of the visitor location register to the home location register and stored in the data record for the user. When the establishment of a connection with the user is requested, parameters from the data record in the home location register are sent to the serving visitor location register during the establishment of the connection. Location registers and programs embodying the invention are also described.

20 Claims, 5 Drawing Sheets

METHOD AND DEVICES FOR IMPROVED LOCATION UPDATING IN A MOBILE COMMUNICATION SYSTEM

TECHNICAL FIELD OF THE INVENTION

The present invention generally relates to a mobile communication system and more particularly but not in a limiting manner, to a method and system for obtaining a location-update in a mobile communication system.

BACKGROUND OF THE INVENTION

For every subscriber of a customary mobile communication system, a data record is stored in a data base denoted as home location register (HLR). Data records of different subscribers can be located in different home location registers. The data records comprise parameters which are used by control nodes in the communication system for the establishment of connections with user equipment of the subscriber. Connections can be established from the user equipment (user originating connection) or to the user equipment (user terminating connection). A connection can be for example a data connection, a speech call, an SMS (Short Message Service) message or the activation, deactivation or interrogation of a supplementary service like activating a call forwarding to a different subscriber number.

To reduce the signaling load during call set up and avoid high local computational loads, many communication systems comprise also visitor location registers (VLR). A VLR also contains sets with subscription related parameters for processing connections of the users served, generally those users located in a limited part of the area covered by the communication system. In most cases, the VLR is collocated with or part of the control node processing connections for the users served by the VLR, e.g. a mobile switching center (MSC). The VLR serves users by providing parameters for connections so that the connections can be processed by the control node serving the user without the necessity to contact the HLR.

Subscription related parameters which are used to process connections can be transferred by messages from the subscriber record in the HLR to the serving VLR. It is possible to copy all or a selection of the parameters since the parameters stored in the VLR can vary according to the capabilities of the VLR and the control node serving the corresponding area. The parameters specify, for example, either services that are provided to the user equipment or parameters which are used in connections. According to G-SM (Global System for Mobile Communications) specification 9.02 and UMTS (Universal Mobile Telecommunication System) 3G Technical Specification 29.002, V3.2-0 of the 3rd Generation Partnership Project, subscriber data is sent from the HLR to the VLR with the MAP (Mobil Application Part) message "Insert Subscriber Data" in response to the message "Update Location" from the VLR. The VLR provides the HLR with the present location of the user equipment. The "Update Location" message is generated by the VLR when the user equipment enters the region served. Especially in the event of a failure in a location register, subscriber data can also be requested with the message "Send Parameters" to update damaged, incomplete or missing subscriber records.

For locating user equipment within the communication system and routing connections to its present location, an identification of the visitor location register serving the user equipment is stored in the home location register. Users can enter the service area of a VLR by moving connected or idle equipment into the area from an area served by another VLR or by switching on the user equipment in the area served. If the presence of a new user equipment is detected in the service area of a VLR, a location update is performed for the subscriber. In a location update, the HLR is notified of the serving VLR which receives in return subscription related parameters from the subscriber record. For setting up a user terminating connection from a first control node, the node identifies the corresponding home location register from the subscriber number. Preferably, the HLR requests a temporary mobile subscriber roaming number from the control node presently serving the user equipment and forwards it to the first control node for setting up the connection. Alternatively, it is conceivable that the home location register provides the identity of the control node or VLR presently serving the subscriber to the first control node.

A location update causes processor load both in the new VLR and in the HLR to which the user equipment is assigned and generally also in a former VLR if a location cancellation is performed there. If the subscriber does not set up or receive a connection during his presence in the respective area, the location-update does not provide any benefit for the operator of the communication system. In many cases, location-updates without any subsequent connection by the user equipment in the respective area, represent a considerable percentage of all location-updates performed. An example for this situation is a densely populated area served by two or more VLRs where users frequently commute between the service areas. Another example are operators with a high percentage of subscribers who set up few connections which is a common behavior for subscribers with prepaid subscriptions.

If a restart of a VLR occurs, e.g. after a failure, stored data of some or all served users can be totally or partially lost or corrupted. In this case, the operation of the VLR is blocked for a considerable time by updating the parameter sets for the respective users in the VLR. During this considerable interval of time, the communication system cannot be accessed by users in the area served by the VLR.

SUMMARY OF THE INVENTION

It is an object of the present invention to obviate the above disadvantages and reduce the processing load in a location register for location updating of idle user equipment. It is a further object, to reduce the time necessary, in the event of a VLR breakdown, for a restart of a VLR.

The invention in its broad form resides in a method for a location update in a mobile communication system which includes a home location register and visitor location registers, wherein the visitor location registers serve different parts of an area covered by the communication system and wherein the home location register holds a data record assigned to a user, the data record comprising parameters for the establishment of connections with the user and an identification of the visitor location register presently serving the user, wherein parameters from the record can be copied from the home location register to the visitor location register serving the user, the method comprising the following steps:

detecting that a user has entered the area served by a visitor location register, sending a location update message which indicates the identity of the visitor location register to the home location register, storing the identity of the visitor location register in the data record for the user, requesting the establishment of a connection with the user, and sending parameters from the data record in the home location register to the serving visitor location register.

In the proposed method, a location update is initiated by the detection that a user has entered the area served by a visitor location register. The service area of a VLR can be entered by moving user equipment into the area or by switching on user equipment which is already located in the respective area. The communication system can detect the presence of the user equipment in the corresponding area for example from a notification, e.g. a location update request, which is sent by the user equipment to the system. Customary user equipment sends a location update request when it moves into a new cell or location area, after it is switched on or periodically. Generally, the notification which identifies the subscriber, is sent to the system control node (e.g. an IVISC) serving the respective area. When the system receives the notification, a check is performed whether the user equipment is already registered in the respective VLR and the position of the user equipment within the service area of the VLR is preferably stored, e.g. the location area which is a cell or group of cells in which the user equipment is presently located.

The notification to the system can be supplemented by an authentication procedure of the user equipment to check whether the user is authorized to have a connection with the communication system, i.e. to prevent unauthorized access. Preferably, parameters for the authentication procedure, e.g. authentication multiplets, are provided to the control node from the visitor location register serving the area which in turn can obtain the parameters from the home location register of the subscriber or from the visitor location register which served the subscriber before.

When a visitor location register detects user equipment that has entered its service area, a location update message is sent to the home location register of the subscriber, i.e. the HLR which holds the data record for the user equipment. The location update message indicates the identity of the visitor location register and can be sent by the visitor location register presently serving the user equipment or the control node receiving the notification from the user equipment, both being integrated preferably in a single device. The identity of the VLR is stored in the subscriber data record in the HLR in order to allow the routing of connections from other users of the communication system to the user equipment. Preferably, the successful execution of this procedure is confirmed by the home location register. Otherwise, a retransmission of the location update message can be performed after a predefined period. A message to cancel the entry in the visitor location register which served the user equipment before the location update can be sent by the home location register. The above steps of the location updating procedure are repeated every time the service area of a VLR is entered and may be repeated several times before the establishment of a connection with the user equipment.

A transmission of parameters from the data record in the home location register to the visitor location register is performed after the communication system, i.e. any node in the system, receives a connection request to establish a connection with the user equipment, e.g. a call. Preferably, the parameters are transmitted during the establishment of the connection by the communication system. The further processing of the connection request is preferably suspended until the VLR receives the parameters. As the transmission and storing of the parameters requires comparatively large resources in the system, optionally a further authentication of the user equipment is performed before the transmission of the parameters. The transmission can for example be requested by the VLR in a message to the home location register. Often, a further node in the communication system receives the service request before the serving VLR, especially for a user terminating connection. In such cases, parameters can be sent without a request from the VLR, e.g. by the HLR when it is contacted by a further control node to provide a roaming number for the subscriber.

Preferably a check is performed to ascertain whether the parameters necessary for the processing of the connection are already present in the visitor location register, e.g. because they were sent to the visitor location register for an earlier connection, and a transmission is performed only if the parameters are not present or the record in the HLR has changed. Finally the connection is established or rejected by the serving control node according to the parameters from the subscriber record.

In contrast to the state of the art, the method of the invention proposes to send parameters from the home location register to the visitor location register during the establishment of the first connection with the user equipment while being served by the respective VLR. In this way, unnecessary transmissions of parameters are avoided for user equipment which does not establish a connection in the area served by a visitor location register. With increasing ratio of location updates to connections, the processor load both in the home and the visitor location registers decreases significantly. The ratio is, for example, often high if the area served by a visitor location register is small as in densely populated regions or if a high percentage of users establishes only few connections. Furthermore, the time for the restart of a visitor location register and consequently the time in which requests to process a connection are not fulfilled is significantly reduced because a transmission of parameters from the home location register is only necessary for users who establish a connection. The amount of signaling generated in the communication system and the memory necessary for storing parameters in the VLR are also reduced. Finally, the integrity of the data is improved as the transfer is performed during the set up of the connections.

In a preferred embodiment of the method, the location update message comprises an indicator as to whether parameters from the data record are requested. In the reply to the location update message, advantageously a home location register sends parameters from the data record according to the setting of the indicator. Preferably, the indicator is a boolean parameter to minimize the length of the location update message. The indicator should optionally allow a processing of the location update message by home location registers which are not adapted to the proposed method. The indicator is preferably set according to the processor load in the VU1. Also the current traffic profile is preferably taken into consideration, i.e. the ratio of connection requests to location updates for users entering the service area. For example, parameters are requested if the ratio and the processor load are below respective thresholds which can be specified by the operator. Other conditions can also be considered for setting the indicator, e.g. the time of the day to avoid high signaling traffic during peak loads of the system. It is proposed that the conditions for setting the indicator are not evaluated for every location update procedure but periodically for a certain interval of time and the same indicator is used for all location update messages in the interval. It is alternatively possible that an operator specifies the indicator for a period of time, e.g. to accelerate a restart of a VLR.

A visitor location register can preferably discard, i.e. not store, parameters from the data record which are sent in reply to a location update message, especially if parameters are sent without request. The latter case occurs if a home location register is not adapted to the proposed method and sends parameters regardless of the indicator setting. The processor load in the visitor location register for discarding the parameters and an additional retransmission of the parameters for a connection is increased in the present invention compared to the state of the art. However, the processor load for an average location update is significantly reduced if the percentage of users without connections in the area served by the VLR is high.

In an embodiment of the inventive method, the visitor location register performs a decision as to whether parameters received in reply to a location update message are stored. Preferably, the result of the decision for setting the indicator is stored for this purpose and the parameters are stored or discarded accordingly. Alternatively, a new decision analogous to the first one is obtained, e.g. according to the processor load and traffic profile in the VLR wherein parameters are discarded if the load under a specific profile exceeds a threshold. It is possible that different thresholds exist for requesting parameters from the home location register and for storing parameiers which are sent from the HLR to the VLR. The decision can also be obtained according to other conditions, e.g. according to the time of the day. An operator can suspend the decision or specify the same result for all decisions, e.g. by setting a threshold to zero or infinity for a period of time.

In order to avoid a retransmission of the parameters from the home location register, it is proposed that a visitor location register confirms the successful reception of parameters which are discarded. Significantly, the interworking with home location registers which are not adapted to the method of the invention is simplified in this way.

Different possibilities exist for the transfer of the parameters from the data record in the HLR to the visitor location register during the set up of a connection. In a simple embodiment of the invention, the visitor location register sends a message to transfer the parameters. In communication systems according to GSM or UMTS specifications, the MAP message "Send Parameters" is suitable for this purpose.

Alternatively, parameters can be requested by the VLR with a further update location message. The update location message comprises an indicator that parameters from the data record are requested or a location update message without indicator, i.e. as used in the state of the art, can be sent. As this further update location message is not initiated by the user equipment, it does not require transmissions to and from the user equipment, e.g. over the A interface according to GSM specifications or the lu interface according to UMTS specifications. Therefore, the processor load is smaller than for a location update procedure initiated by user equipment.

To simplify and accelerate the establishment of a connection, a decision can be obtained whether parameters from the data record in the HLR are necessary and requested before the establishment. For a user terminating connection, often only the party initiating the connection is charged. Parameters can, therefore, optionally be requested only for connections for which the subscriber is charged, e.g. user originating connections, or for which different connection parameters are accessible with different subscriptions.

For the set up of a user terminating connection, the home location register is contacted to provide the user location, generally as a roaming number for the terminating user equipment. Therefore, parameters from the data record can be included by the HLR in a message which requests the roaming number from the VLR. This embodiment avoids an increase in the time to set up the connection by additional messages between HLR and VLR. Preferably, the HLR performs a check whether the parameters have to be sent with the request to provide the roaming number. For this purpose, the subscriber record in the HLR can comprise an indicator as to whether the parameters were requested or sent since the last location update.

Location registers for mobile communication systems comprise a memory or data base with user related parameters and a processing system for accessing and managing the contents of the data base. All procedures executed by a VLR or an HLR as described below can be executed by functional units in the respective location register. Preferably, the units are embodied as software units which are executed in the processing system of the location register.

A VLR for serving an area in a mobile communication system has an interface to receive messages from user equipment located in the area served and an interface for accessing a home location register with a data record assigned to the user equipment. The interfaces can be identical or part of a single input/output unit in the VLR itself or in a control node integrated with the VLR. Messages between the VLR and an HLR or between the VLR and user equipment will generally be relayed by other nodes in the communication system. The visitor location register detects from the comparison of received messages and stored data that user equipment has entered the area served. Preferably, location update requests received from user equipment are checked whether the user is already registered in the VLR. If a user is detected who has entered the service area, the VLR sends a location update message indicating the identities of the detected user equipment and the visitor location register to the HLR of the user.

Parameters can be copied from the subscriber data record in the HLR to the visitor location register. A visitor location register, according to the invention initiates the transmission of parameters from the data record in the home location register when the establishment of a connection between the system and the user equipment is requested.

In a preferred embodiment of the invention, a VLR comprises a unit to perform a decision whether the transfer of parameters from the data record is initiated during the establishment of a connection. The unit preferably checks whether parameters are already present in the data base of the register or if the parameters are necessary for the establishment of the requested connection. In this way, data transmissions can be reduced and the set up of connections can be accelerated.

Advantageously, in a visitor location register, a unit obtains a decision whether parameters from the subscriber data record are requested with the location update message and the visitor location register sets an indicator in the message according to the decision. In this way, the VLR can elect to perform a location update as known in the state of the art or a location update as proposed in the above method.

Home location registers as used in the state of the art always transmit a set of parameters from the record in a message in reply to the location update message. Preferably, a visitor location register can discard parameters from the subscriber record which are sent by the home location register in reply to a location update message. In this way, the processing load for parameters received without request is reduced. Preferably, a unit in the VLR obtains a decision as to whether parameters received in reply to a location update message are stored.

The decisions to request and/or discard parameters can be performed according to the processing load or traffic profile of the visitor location register or both. The processing load is usually monitored by a unit in the VLR for load control, maintenance and statistics purposes. Therefore, the monitored value can be transferred to the deciding unit as basis for the decision which is which is preferably performed periodically. For example, the parameters are discarded if the processing load is above a defined threshold and parameters are requested if the processing load is below the same or a different threshold. The result of the decision to request parameters can be stored and used in the decision to discard parameters.

To avoid an unnecessary retransmission of parameters and reduce the signaling traffic in the communication system, preferably, the visitor location register confirms the reception of discarded parameters to the home location register.

A home location register for a mobile communication system holds data records assigned to users wherein the records comprise parameters used by the system for the establishment of connections with the respective user and an identification of the visitor location register presently serving him. The HLR has an interface over which parameters from the record can be copied to the serving VLR and location update messages can be received from visitor location registers. Preferably, the home location register checks whether location update messages comprise an indicator as to whether parameters from the record are requested and returns parameters in a reply to the location update message if the indicator indicates that parameters are requested. In this way, unnecessary parameter transmissions and their processing by a VLR are avoided.

Expediently, the home location register stores, e.g. in a boolean parameter of the data record, whether the serving visitor location register was provided with parameters from the data record during or after the last location update. When a user terminating connection is requested, the HLR sends a message to the serving VLR to request a roaming number for the subscriber. If parameters were not sent before, they can be included in the message to provide the roaming number. Therefore, the parameters are present in the VLR when the request for the establishment of a connection to the provided roaming number is received at the corresponding node, and delays in the set up of the connection are avoided.

A program unit stored on a data carrier loadable into a visitor location register for a mobile communication system is generally part of the software for operating the VLR. The program unit checks whether the establishment of a connection with the user is requested and initiates the transfer of parameters from the corresponding data record in the home location register to the visitor location register upon the request. The transfer can be initiated by a message or by setting a corresponding indicator in a message to the HLR. Preferably, the unit checks whether the parameters are already present in the VLR and initiates the transfer only if this is not the case.

Preferably, a program unit stored on a data carrier or loadable into a home location register for a mobile communication system is part of the software for operating the HLR. The program unit checks location update messages for an indicator whether parameters from the record are requested. The unit initiates the return of parameters in reply to the location update message according to the indicator.

The program units can perform any steps of the above described methods which relate to the respective location register.

The foregoing and other objects, features and advantages of the present invention will become more apparent from the following detailed description of preferred embodiments to be understood in conjunction with the accompanying drawings.

DETAILED DESCRIPTION OF THE INVENTION

Figure 1:
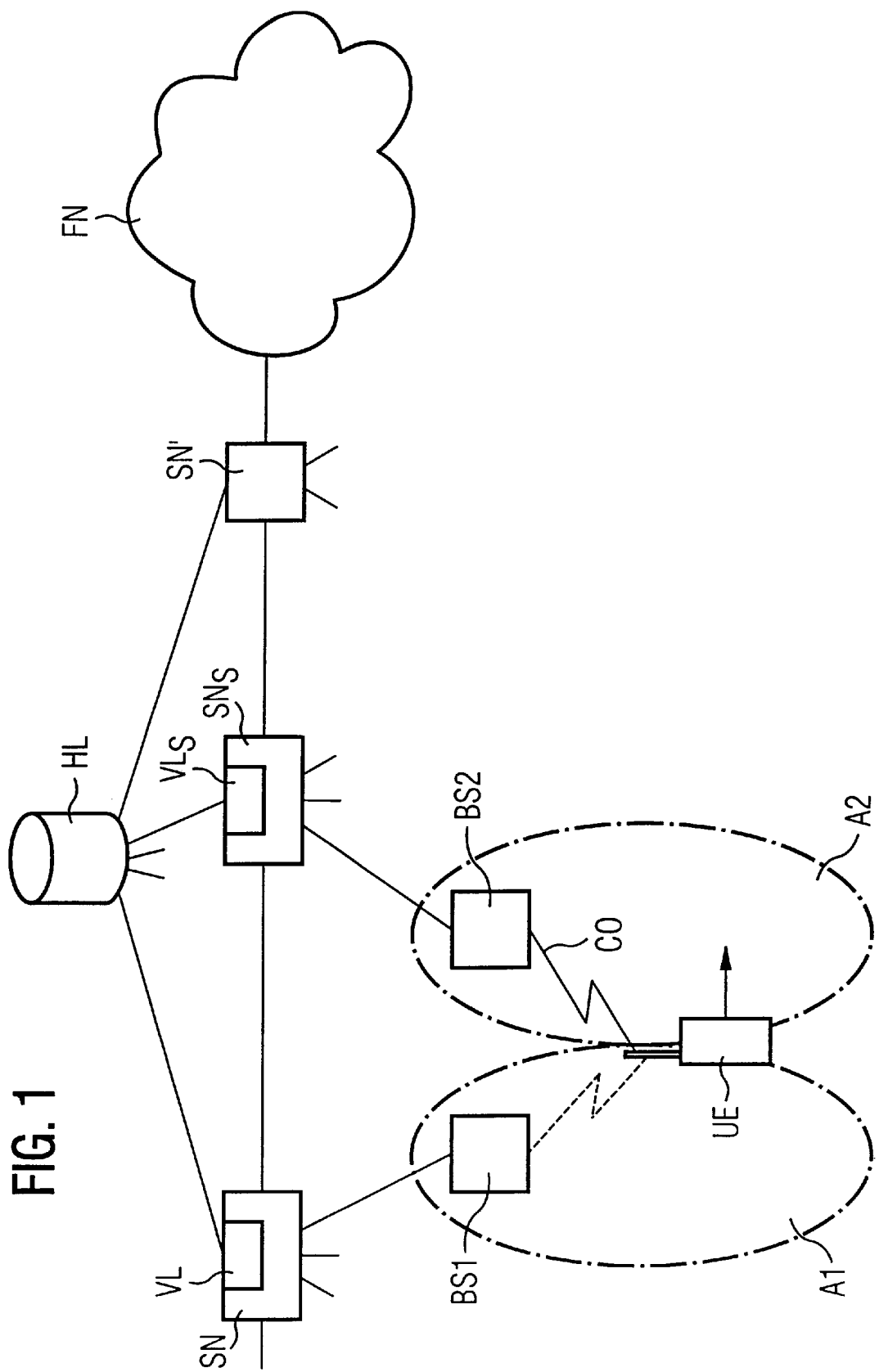
FIG. 1 shows a representation of a network in which a method according to the invention is performed

In FIG. 1, a communication system is depicted in which the method according to the invention is performed. The communication system comprises interconnected control nodes SN, e.g. mobile switching centers MSC according to GSM or UIVITS specifications. The interconnected control nodes SN are often denoted as the core network of the communication system. User equipment UE, e.g. mobile phones or other mobile terminals, can be connected to the communication system over base station subsystems BS1, BS2 which serve different partial areas A1, A2 of the area covered by the communication system. A base station subsystem BS comprises one or more base stations for the wireless connection CO to the user equipment and at least one control node, e.g. a base station controller (BSC), for controlling the base stations and connecting them to a control node SN. Instead of or in addition to GSM base station subsystems BS, any other access network can provide the access of the user equipment UE to the control nodes SN, for example UIVITS access networks with radio network controllers (RNC) or wireless local area networks (WILAN). Generally, the communication system is connected to further networks FN which can have a different operator or be located in a different country. As indicated by the incomplete connections, the system can comprise a plurality of further nodes.

User equipment UE can move through the coverage area of the communication system, for example between areas A1, A2 served by different base station subsystems BS1, BS2 as indicated by the arrow in FIG. 1. To allow the establishment of connections to the user equipment UE, a home location register HL is assigned to the user equipment UE. It is possible that a communication system comprises more than one home location register HL or that a home location register is located in a further network FN, e.g. if the user equipment UE is roaming in a foreign country. The home location register HL is provided with an indication of the present position of the user equipment UE which is stored in a corresponding data record. In customary cellular networks, the indication of the position is the identity of a visitor location register VLs presently serving the user equipment. It is possible to have separate control nodes SN and visitor location registers VL, e.g. if several control nodes SN share a common visitor location register VL, but preferably a visitor location register VL is collocated or integrated with a control node SN serving the same area or the same users. The advantages of these options depend, however, on the architecture of the communication system and may vary, e.g. if different control nodes SN can serve the same area as in a system with separate nodes for processing and controlling connections, i.e. a system with separate control and user planes, wherein the connections between control nodes SN and access networks can be changed and differ for different users.

If a first control node SN' receives a request for the establishment of a connection to the user equipment UE, the first control node SN' sends a message to the home location register HL of the user equipment to obtain the present location. In customary networks, the home location register HL sends a message to the serving visitor location register VLs which is stored in the record of the user equipment. The message requests a roaming number of the user equipment which is returned by the serving visitor location register VLs to the home location register HL and forwarded to the first control node SN for setting up the connection.

The user record in the home location register comprises also parameters indicating which connection options are accessible to a user. The parameters can be copied from the home location register HL to the visitor location register VLs serving the user equipment. In customary communication systems, the parameters are always copied to the serving visitor location register VLs when the corresponding entry in the user record is updated. This causes a high processing load both in the home location register and in the visitor location registers and increases the signaling traffic in the network.

Figure 2:
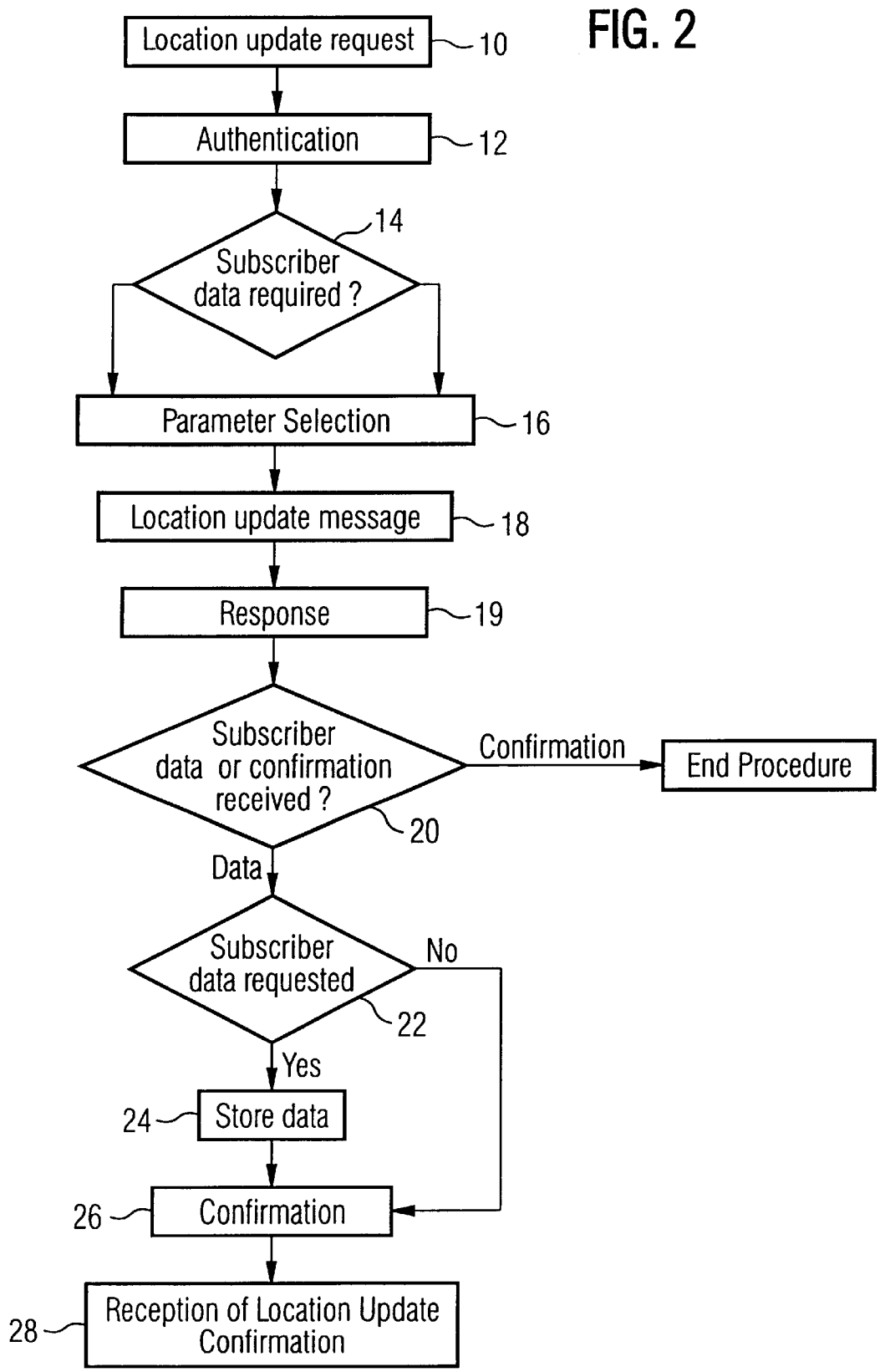
FIG. 2 shows a location update procedure according to the invention which is executed in a VLR.

FIG. 2 depicts a flow chart of the steps in a preferred method according to the invention which are performed in a visitor location register integrated with a control node. When user equipment UE enters the service area A2 of a visitor location register VLs, it sends a location update request 10 to the visitor location register VLs. After reception of the request 10, an authentication 12 is performed to ensure that the user equipment is authorized to access the communication system. For this purpose, the home location register or, optionally, the former visitor location register serving the user equipment is contacted to obtain the information necessary to authenticate the user, e.g. authentication multiplets. Preferably, also an equipment identity register (EIR) is contacted during the authentication to check whether user equipment is stolen. Authentication procedures are known in the state of the art and described for example in GSM or UMTS specifications.

After authentication step 12, a decision step 14 is performed in the visitor location register as to whether subscriber data is required. The decision step 14 comprises a check whether subscriber data is already present in the memory of the visitor location register, e.g. if user equipment reenters a service area which was recently left. Preferably, the decision is based on the processing load and the traffic profile in the visitor location register. In case of a high load which can be defined by a threshold, it is disadvantageous for certain traffic profiles to request data from the subscriber record because the load would be further increased by the data processing while additional processor load can be acceptable at other times. Additional conditions are possible to decide whether subscriber data is required. According to the result of the decision step 14, the parameters in a message 18 for requesting a location update in the home location register HL are selected in selection step 16 and the location update message 18 is subsequently sent. In particular, an indicator can be set in the MAP (mobile application part) message "update location" to indicate whether parameters from the subscriber record are requested.

The response step 19 from the home location register is analyzed by the visitor location register after reception. In check step 20, preferably the type of the received message is determined which can be a location update confirmation or a message comprising parameters from the subscriber record. Alternatively, the contents of the response 19 are examined in check step 20 whether parameters from the subscriber record are included. If the home location register checks the location update message 18 for a corresponding indicator and unless parameters are requested by the visitor location register, response step 19 is preferably a confirmation of the location update as the confirmation in step 28. The location update procedure is ended if the correct reception of the location update message is confirmed in response 19. Else a confirmation is preferably requested and awaited before ending the procedure if no parameters are "received.

Response step 19 can also contain parameters from the subscriber record, especially when requested in location update message 18 or when a home location register sends parameters in reply to any location update message without checking the indicator. When parameters are received, the visitor location register performs a further decision 22 whether the parameters are stored or discarded. It is proposed to store an indicator in the visitor location register whether parameters are requested when a location update message is sent. Subscription parameters are preferably only stored in the memory of the visitor location register in step 24 when they were requested with the location update message and are discarded else. In both cases, a confirmation 26 of the successful reception of the parameters in the visitor location register is sent to the home location register and the location update procedure ended after reception 28 of a confirmation of the location update from the HLR. It is conceivable to replace decision 22 by a further decision 14 whether subscriber data is required, especially if different conditions, e.g. different thresholds for a high processor load, are used in both decisions.

Figure 3:
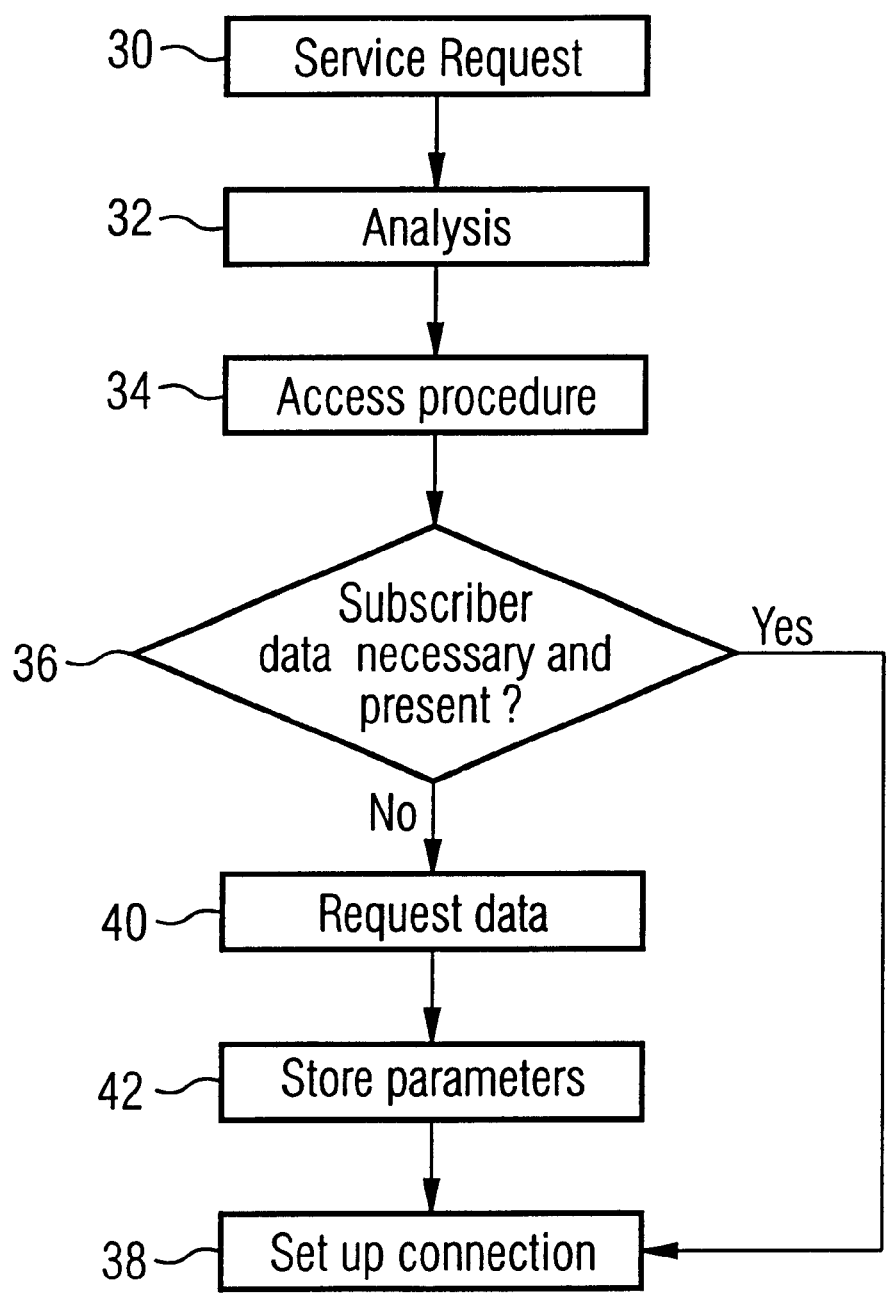
FIG. 3 shows the processing of a mobile originating connection.

To initiate a user originating connection, a service request 30 is sent from the user equipment to the serving control node SNs as shown in FIG. 3. An analysis 32 of the request is performed as it is known in the state of the art. Analysis 32 includes for example the unpacking of the service request, a check of the capabilities of the mobile equipment for setting up connections with an access network or base station subsystem and it is checked whether the request indicates an emergency call which is processed without authentication. The usual access procedure 34 is performed which comprises e.g. the authentication and a confirmation of the radio contact to the user equipment.

Then a decision 36 is performed whether the subscriber data necessary for setting up the connection is present in the visitor location register assigned to the control node. Decision 36 can be subdivided into two parts, i.e. a check whether any data is necessary and whether this data is present. If the data is present, the usual set up 38 of the connection is performed. Otherwise, the set up is suspended and a message 40 is sent to the home location register to send subscriber data. The message 40 can be a MAP message "Send Parameters" or a message "Update location" with a request to send subscription related parameters. The parameters received in response are stored in the visitor location register in step 42. Finally, the set up 38 of the connection is performed.

Figure 4:
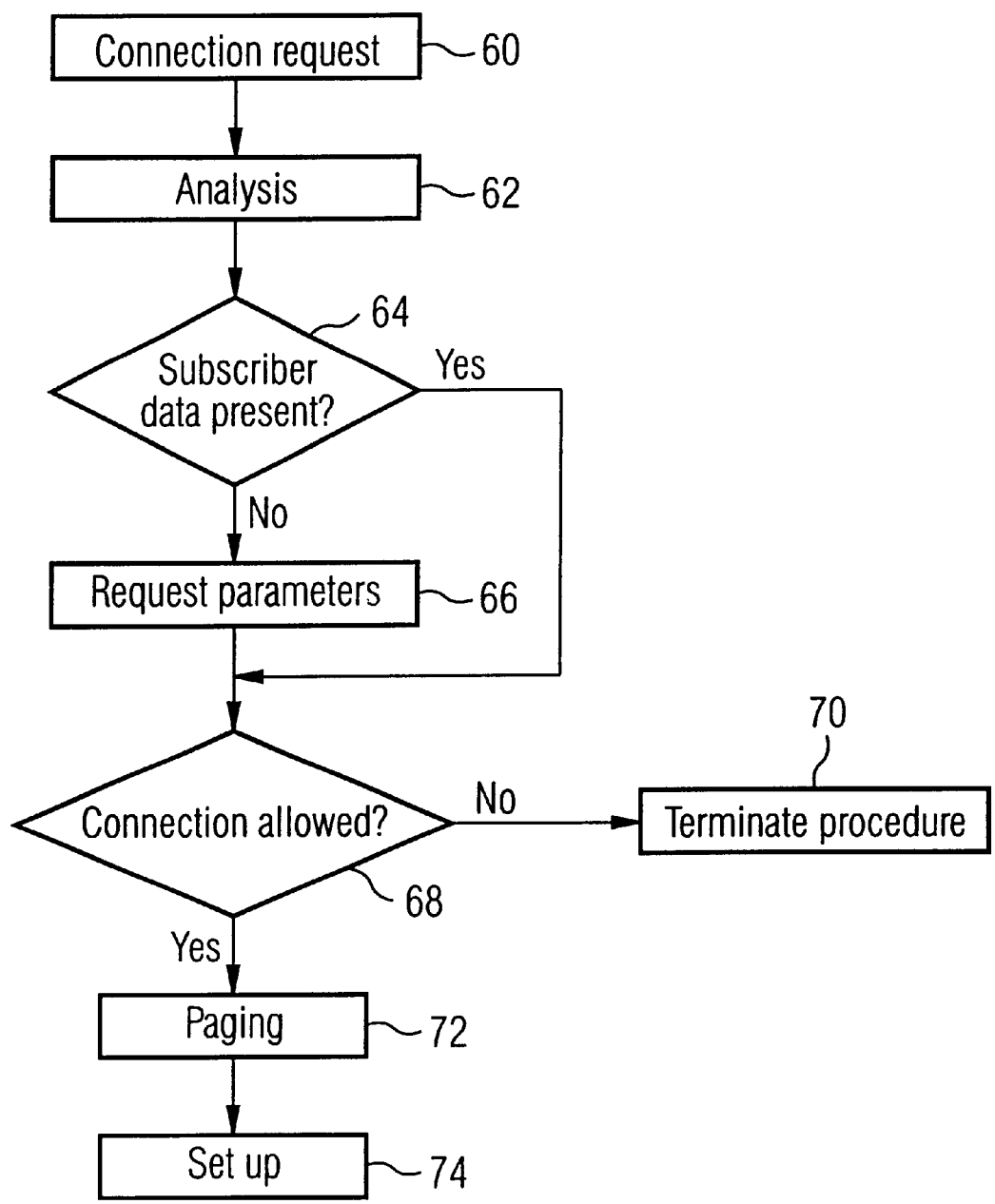
FIG. 4 shows the processing of a mobile terminating connection.

FIG. 4 shows the set up of a terminating connection to the user equipment by a visitor location register combined with a control node, e.g. an MSC/VLR, in a method according to the invention. The procedure is initiated with the reception of a request 60 to set up a connection with the user equipment. Generally, the terminating user is represented in connection request 60 by his roaming number which was attributed to him before and which is obtainable via the home location register of the user. In subsequent analysis 62, the request is analyzed for the parameters which are necessary for the requested service. Then a check 64 is performed whether subscriber data is present in the visitor location register. Preferably, it is also decided in check 64 whether any subscriber data is necessary for the requested service, e.g. when it is a free service or exclusively paid by the originating user of the connection. For such cases, an operator can specify that a connection is always set up to the user equipment and parameters of the terminating user need not be checked whether he is allowed to have the corresponding connection. If subscriber data is missing and, optionally, identified as necessary, the corresponding parameters are requested from the home location register with request 66.

When the subscription parameters are present at the visitor location register, a check 68 is performed whether the terminating user is subscribed to the requested connection, e.g. telephone call, fax, SMS or a data transmission with a specific set of parameters. If the user is not allowed to have the requested service, the connection is terminated in step 70. Otherwise, a customary paging 72 of the user equipment is performed and the connection set up is finished in step 74.

Figure 4A:
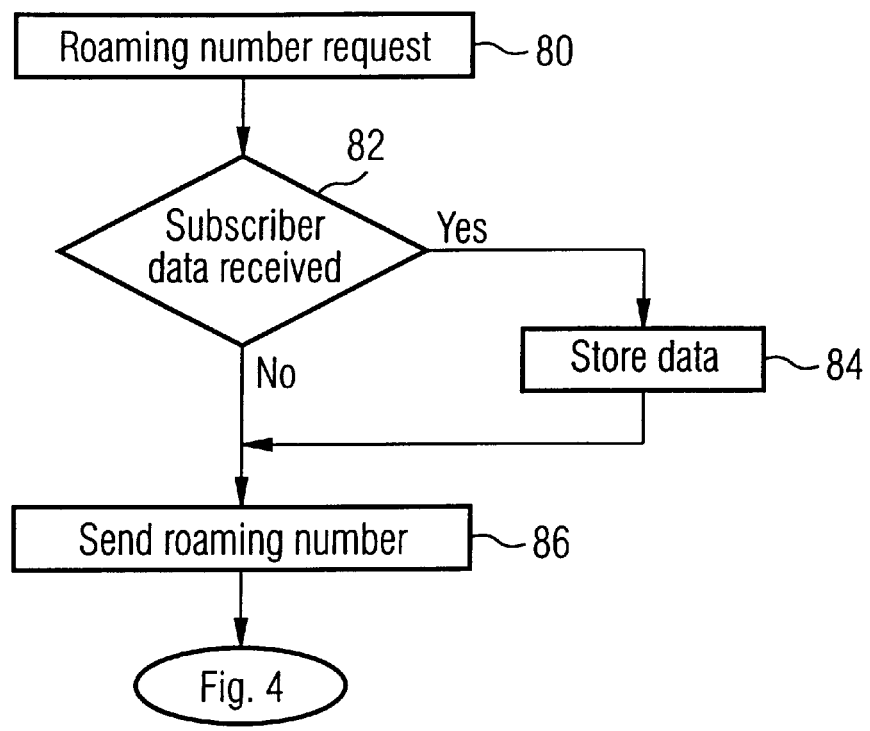
FIG. 4a shows a supplement to the processing depicted in FIG. 4.

In many communication systems, e.g. those according to GSM or UMTS specifications, the connection request 60 comprises a roaming number attributed to the user. In this case, the procedure in FIG. 4 can be preceded by the steps shown in FIG. 4a. When the home location register of the user is contacted to provide the roaming number, it sends a corresponding request 80, e.g. a MAP message, to the visitor location register. Optionally, the home location register sends subscription parameters with any request 80 for a roaming number to a visitor location register. More preferably, it stores information as to whether parameters are sent, checks before a roaming number request if subscription related parameters were already provided for the specific user to the VLR, and if negative, includes them in the request 80.

When the request 80 is received in the visitor location register, it performs a check 82 whether the request 80 comprises subscriber data from the record in the home location register. When data is provided, it is stored in step 84. The visitor location register sends a roaming number for the subscriber to the home location register in step 86. Subsequently, the procedure in FIG. 4 can be started when a connection request with the provided roaming number is received. This embodiment has the advantage that the number of messages and the processing time of the connection request is reduced compared to the method depicted in FIG. 4. Especially, request 66 is not necessary because the data is already present at the visitor location register when the connection request 60 is received. Preferably, however, check 64 is still performed to avoid problems when only some home location registers provide parameters with the roaming number request.

Figure 5:
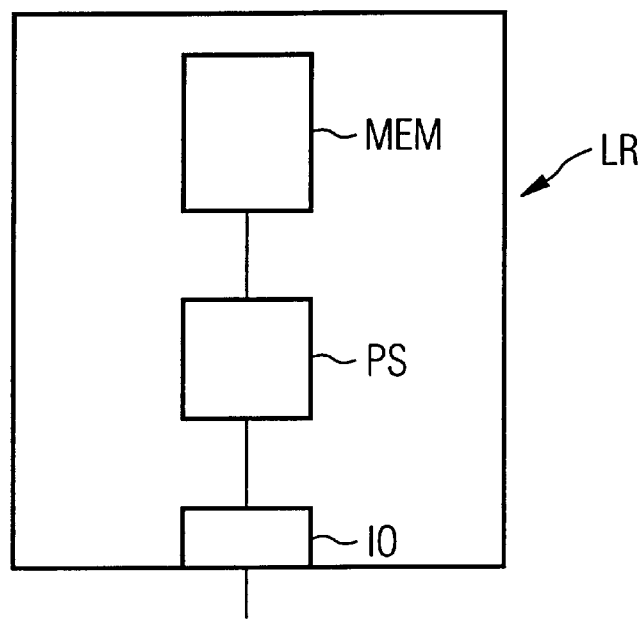
FIG. 5 shows a location register (LR) for a communication system in accordance with the teachings of the present invention.

FIG. 5 depicts a location register LR for a communication system, the location register LR comprising a memory MEM, a processing system PS and an interface 10 for the input and output of data or messages. The memory MEM stores user related parameters. The processing system PS can access and manage the contents of the memory MEM and processes messages or parameters which are sent or received via the interface 10. Procedures performed in the location register LR are preferably embodied as function units in the processing system. Preferably, the units are implemented as software units which are executed in the processing system PS. Depending on the contents of the memory MEM and the units executed in the processing system PS, the location register can be either a VLR or an HLR.

The above embodiments admirably achieve the objects of the invention. However, it will be appreciated that departures can be made by those skilled in the art without departing from the scope of the invention which is limited only by the claims.

What is claimed is:

1. Method for a location update in a mobile communication system which includes a home location register (HL) and visitor location registers (VL), wherein the visitor location registers serve different parts of an area covered by the communication system and wherein the home location register holds a data record assigned to a user, the data record including parameters for establishment of connections with the user and an identification of the visitor location register presently serving the user, wherein parameters from the record can be copied from the home location register to the visitor location register serving the user, the method comprising the following steps:

detecting that a user has entered the area served by a visitor location register, sending a location update message which indicates the identity of the visitor location register to the home location register, storing the identity of the visitor location register in the data record for the user in said home location register, receiving a request to establish a communication connection with the user, and sending said parameters from the data record in the home location register (HL) to the serving visitor location register in response to receiving said request for communication connection.

2. Method according to claim 1, including deciding whether parameters from the data record are requested and the location update message received from said visitor location register further comprises an indicator according to the decision.

3. Method according to claim 1 including the step of the visitor location register (VL) discarding parameters from the data record which are sent by the home location register in reply to the location update message.

4. Method according to claim 3, including the step wherein the visitor location register (VL) performs a decision whether parameters sent in reply to the location update message are stored.

5. Method according to claim 2, including the step wherein at least one decision is performed according to the processing load and/or the traffic profile in the visitor location register.

6. Method according to claim 3, including the step of confirming that the visitor location register (VL) receives discarded parameters to the home location register.

7. Method according to claim 1, including the step wherein parameters from the data record in the home location register (HL) are sent in reply to a message from the visitor location register (VL) to send parameters.

8. Method according to claim 1, including the step wherein parameters from the data record in the home location register are sent in reply to a further location update message.

9. Method according to claim 1, including the step of deciding whether parameters from the data record in the home location register are requested before a connection is established.

10. Method according to claim 1, including the step wherein parameters from the data record in the home location register are sent with a message from the home location register to provide a roaming number for the user.

11. A visitor location register for serving an area in a mobile communication system, comprising: a memory, an interface to receive messages from user equipment located in the area served; an interface for accessing a home location register with a data record assigned to the user equipment and a processing system to detect from received messages that user equipment has entered the area served, to send a location update message to said home location register, the location update message indicating the detected user equipment and the visitor location register, and to store parameters from the data record for connections between the system and the user equipment in the memory, further wherein said processing system is configured to receive the transmission of parameters from the data record in the home location register wherein said transmission of parameters is initiated in response to a request for establishment of a connection with the user equipment.

12. A visitor location register according to claim 11, including a unit which performs a decision whether the transfer of parameters from the data record initiated when the connection is requested.

13. A visitor location register according to claim 11, further comprising a unit for performing a decision whether parameters from the data record are requested with the location update message and the visitor location register sets an indicator in the message according to the decision.

14. A visitor location register according to claim 11, wherein the visitor location register is configured to discard parameters from the data record which are sent by the home location register in reply to a location update message.

15. A visitor location register according to claim 14, including a unit which performs a decision whether parameters received in reply to a location update message are stored.

16. A visitor location register according to claim 13, wherein at least one decision is performed according to the processing load and/or the traffic profile of the visitor location register.

17. A visitor location register according to claim 14, wherein the visitor location register confirms the reception of discarded parameters to the home location register.

18. A home location register for a mobile communication system which uses visitor location registers serving parts of an area covered by the communication system, the home location register comprising a memory for holding at least one data record assigned to a user, said one data record comprising parameters for the establishment of connections of the system with a user and an identification of the visitor location register presently serving the user, wherein the home location register includes a processing system and an interface to copy parameters from a record of the user to the serving visitor location register and to receive location update messages indicating an identity of the serving visitor location register, wherein said processing system is configured to check location-update messages for an indicator to ascertain whether parameters from the record are requested and returned in reply to said location update-message according to the indicator and wherein said parameters are provided to the visitor location register in response to a request for communication connection with said user.

19. A home location register according to claim 18, wherein the home location register stores whether a visitor location register is provided with parameters from the data record and includes parameters in a message to the visitor location register to provide a roaming number for the user if the parameters were not provided before.

20. Program unit on a data carrier or loadable into a home location register for a mobile communication system which has visitor location registers serving parts of the area covered by the communication system, said home location register holding at least one data record assigned to a user, said data record comprising parameters for connections of the system with the user and an identification of the visitor location register presently serving the user, wherein parameters from the record can be copied from the home location register (HL) to the serving visitor location register and location update messages from a visitor location register indicate an identity of the serving visitor location register, wherein the program unit initiates the return of said parameters to said visitor location register in response to a request for establishing a communication connection with said user.

* * * * *